(12) United States Patent
Anagnos et al.

(10) Patent No.: US 8,714,517 B2
(45) Date of Patent: May 6, 2014

(54) BONNET APPARATUS TO PROVIDE LIVE-LOADING TO A SEAL

(75) Inventors: Richard James Anagnos, Conrad, IA (US); Thomas Jeffrey Miller, Quincy, MA (US)

(73) Assignee: Fisher Controls International, LLC, Marshalltown, IA (US)

( * ) Notice: Subject to any disclaimer, the term of this patent is extended or adjusted under 35 U.S.C. 154(b) by 331 days.

(21) Appl. No.: 12/886,190

(22) Filed: Sep. 20, 2010

(65) Prior Publication Data
US 2012/0068102 A1    Mar. 22, 2012

(51) Int. Cl.
*F16K 31/00*    (2006.01)
(52) U.S. Cl.
USPC .......................... 251/61.4; 251/61.3; 251/331
(58) Field of Classification Search
USPC .......... 251/61, 61.1–61.5, 331, 335.2, 129.17
See application file for complete search history.

(56) References Cited

U.S. PATENT DOCUMENTS

| | | | | |
|---|---|---|---|---|
| 3,874,636 | A | * | 4/1975 | Bake et al. ................. 251/335.2 |
| 3,927,650 | A | * | 12/1975 | Smith et al. .............. 123/568.29 |
| 3,946,983 | A | * | 3/1976 | Engberg ...................... 251/61.2 |
| 4,454,893 | A | | 6/1984 | Orchard |
| 4,635,537 | A | * | 1/1987 | Field .............................. 92/98 R |
| 5,499,648 | A | * | 3/1996 | Powell et al. .............. 137/15.24 |
| 5,512,249 | A | | 4/1996 | Singh |
| 7,287,545 | B2 | | 10/2007 | Zelson |
| 2007/0075284 | A1 | * | 4/2007 | Masamura et al. .......... 251/63.5 |
| 2009/0014078 | A1 | * | 1/2009 | Gamache et al. ........ 137/625.48 |

FOREIGN PATENT DOCUMENTS

| | | |
|---|---|---|
| EP | 0234835 | 2/1987 |
| GB | 682839 | 11/1952 |

OTHER PUBLICATIONS

Baumann, Inc., "Sanitary Process Valves and Regulators," Oct. 2002, 16 pages.
Baumann, Inc., "Control Valve-Actuator Assemblies 83000, 84000, 87000, 88000, 96000," 14 pages.
International Searching Authority, "International Search Report," issued in connection with application serial No. PCT/US2011/051428, mailed Nov. 24, 2011, 2 pages.
International Searching Authority, "Written Opinion of the International Searching Authority," issued in connection with application serial No. PCT/US2011/051428, mailed Nov. 24, 2011, 6 pages.

* cited by examiner

*Primary Examiner* — John K Fristoe, Jr.
*Assistant Examiner* — Angelisa Hicks
(74) *Attorney, Agent, or Firm* — Hanley, Flight & Zimmerman, LLC.

(57) ABSTRACT

Bonnet apparatus to provide live-loading to a seal are described herein. An example bonnet assembly includes a housing having a recessed opening to define a shoulder and a sealing disc disposed within the recessed opening. A biasing element is disposed in the recessed opening between a flange of the sealing disc and the shoulder of the housing to provide a load to a seal to be disposed between the housing and the fluid device. The biasing element biases the sealing disc away from the housing and the biasing element enables the sealing disc to move within the recessed opening relative to the housing when the bonnet assembly is coupled to the fluid device.

21 Claims, 6 Drawing Sheets

BONNET APPARATUS TO PROVIDE LIVE-LOADING TO A SEAL

FIELD OF THE DISCLOSURE

The present disclosure relates generally to fluid valves and, more particularly, to bonnet apparatus to provide live-loading to a seal.

BACKGROUND

Process control systems often employ fluid devices such as, for example, pumps, fluid valves, etc. to control the flow of process fluids. For example, a fluid valve typically includes a fluid flow control member that is disposed within a fluid path of a valve body. A valve stem (e.g., a sliding stem) operatively couples an actuator to the flow control member, which moves the flow control member relative to an orifice or valve seat to control fluid flow through the fluid path. The actuator (e.g., a pneumatic actuator) moves the flow control member between an open position at which the flow control member moves away from the valve seat to allow fluid flow through the valve and a closed position at which the flow control member engages the valve seat to restrict or prevent fluid flow through the valve.

In sanitary systems, a fluid valve often includes a flow control member that comprises a diaphragm to provide a sanitary condition. The diaphragm is composed of an elastomeric material that includes a peripheral edge that is clamped or compressed between a bonnet and a valve body to provide a seal between the valve body and the bonnet. When coupled to the valve body, the bonnet provides a compressive load to the peripheral edge of the diaphragm. In operation, the diaphragm may be subjected to substantial temperature and/or pressure fluctuations of a process fluid flowing through the valve body that may cause the diaphragm to expand and/or contract between the bonnet and the valve body. Such expansion and/or contraction of the diaphragm may cause the compressive load imparted to the peripheral edge of the diaphragm to be greater than a maximum allowable load, thereby causing the diaphragm to buckle, deform or otherwise become damaged.

SUMMARY

In one example, a bonnet assembly includes a housing having a recessed opening to define a shoulder and a sealing disc disposed within the recessed opening. A biasing element is disposed in the recessed opening between a flange of the sealing disc and the shoulder of the housing to provide a load to a seal to be disposed between the housing and the fluid device. The biasing element biases the sealing disc away from the housing and the biasing element enables the sealing disc to move within the recessed opening relative to the housing when the bonnet assembly is coupled to the fluid device.

In another example, a fluid valve includes a valve body having a fluid flow passageway between an inlet and an outlet and a bonnet coupled to the valve body. A diaphragm having a peripheral edge is clamped between a load assembly of the bonnet and the valve body. The load assembly includes a sealing disc disposed within a recessed opening of the bonnet and a biasing element disposed within the recessed opening between the sealing disc and the bonnet. The biasing element biases the sealing disc toward the diaphragm to provide a load to the peripheral edge of the diaphragm and the sealing disc moves relative to the bonnet to allow the diaphragm to expand or contract.

DETAILED DESCRIPTION

In general, the example bonnet apparatus described herein provide live-loading to a seal during operation of a fluid control device. In some examples, a bonnet apparatus described herein enables a diaphragm of a fluid valve to expand and contract as a temperature and/or pressure of a process fluid flowing through the control valve fluctuates while providing a controlled or substantially constant compressive load to a peripheral edge or seal portion of the diaphragm, thereby preventing damage to the diaphragm. More specifically, an example bonnet assembly described herein includes a load assembly that captures the peripheral edge of the diaphragm between a housing of the bonnet assembly and a valve body.

In particular, the load assembly may include a movable sealing disc and a biasing element. The biasing element enables the sealing disc to move or float relative to a housing of the bonnet assembly to enable a seal portion of an elastomeric diaphragm to expand or contract to control the compressive load applied to the seal portion during operation of the fluid valve and thereby prevent the diaphragm from buckling, deforming or otherwise becoming damaged. As a result, the example bonnet apparatus can substantially eliminate leakage of process fluid past the diaphragm due to thermo-set that may otherwise occur due to temperature and/or pressure fluctuations of the process fluid flowing past the diaphragm. Further, the example load assembly described herein can provide a controlled, substantially constant load to the peripheral edge of the diaphragm that is independent of a clamping force provided by fasteners that couple the bonnet assembly to the valve body. Thus, over tightening or under tightening the fasteners does not affect the compressive load provide to the peripheral edge of the diaphragm. In operation, the load assembly can provide and maintain an acceptable compressive load to the diaphragm (e.g., a load that is less than a maximum allowable load).

Figure 1:
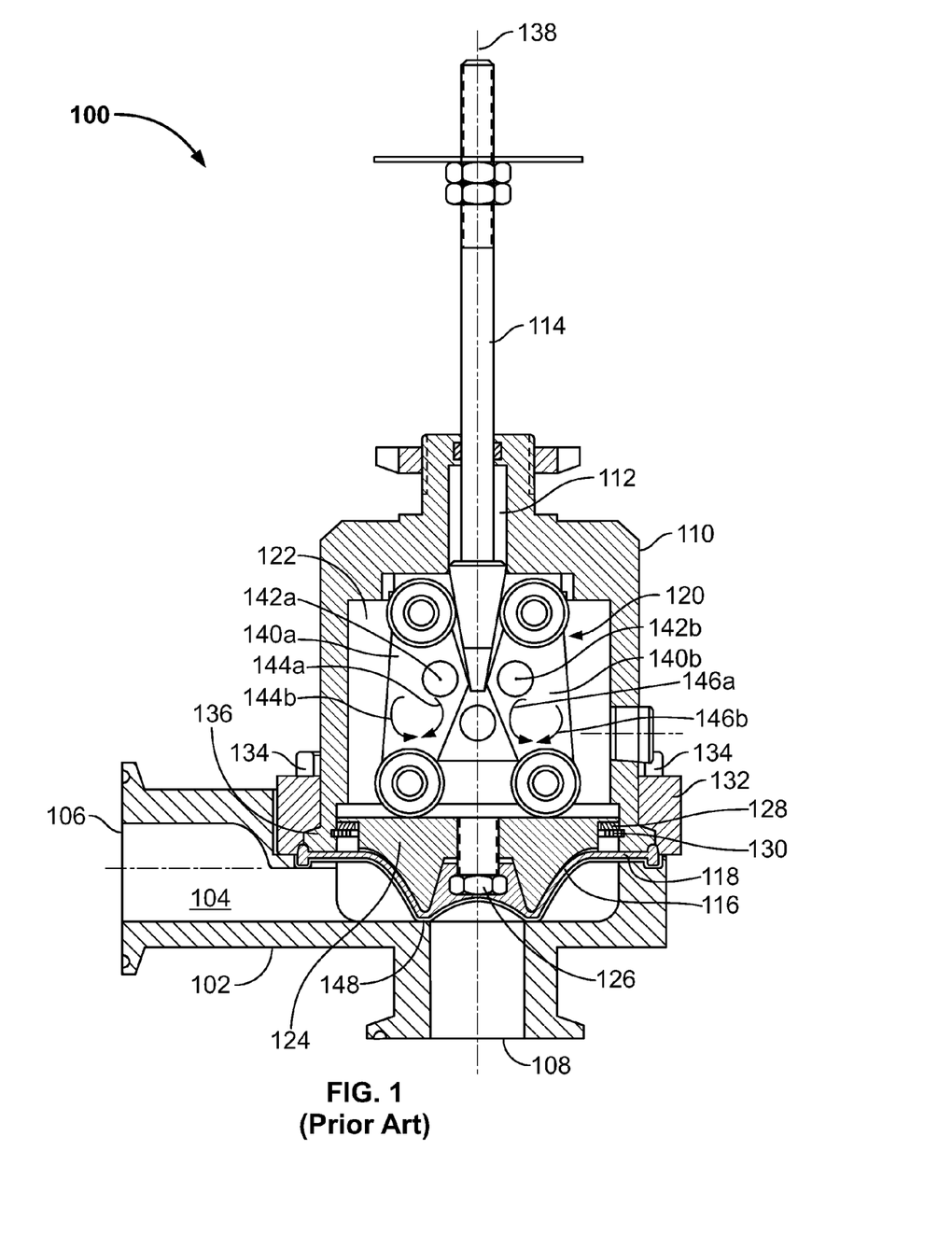
FIG. 1 illustrates a known fluid control valve.

Before discussing an example bonnet apparatus in detail, a brief description of a known fluid valve 100 is provided below in connection with FIG. 1. The known fluid valve 100 includes a valve body 102 that defines a fluid flow passageway 104 between an inlet 106 and an outlet 108. A bonnet 110 couples the valve body 102 to an actuator (not shown) (e.g., a pneumatic actuator) and includes an opening 112 to slidably receive a valve stem 114, which operatively couples the actuator to a flow control member 116 disposed within the passageway 104. As shown, the flow control member 116 is a flexible diaphragm 116 composed of an elastomeric material that is captured between the bonnet 110 and the valve body 102. More specifically, the diaphragm 116 includes a peripheral edge or seal portion 118 that is captured between the bonnet 110 and the valve body 102. The fluid valve 100 may also include a drive mechanism or force amplifier 120 disposed within a cavity 122 of the bonnet 110. The drive mechanism 120 is operatively coupled to the diaphragm 116 via a diaphragm plate 124. The diaphragm plate 124 is coupled to the diaphragm 116 via a fastener 126 and provides support to the diaphragm 116. Additionally, a biasing element 128 biases the diaphragm plate 124 and, thus, the diaphragm 116 toward the drive mechanism 120. A retaining ring 130 retains the biasing element 128 within the bonnet 110.

A bonnet flange 132 couples the bonnet 110 to the valve body 102 via fasteners 134. When the fasteners 134 are tightened (e.g., to 451b-ft torque), the bonnet flange 132 engages the bonnet 110 and causes an end 136 of the bonnet 110 to move toward the valve body 102 to engage or pinch the peripheral edge 118 and provide an axial load or pre-load to the diaphragm 116 along an axis 138. However, the end 136 of the bonnet 110 does not engage the valve body 102 (e.g., a small gap remains between the bonnet flange 132 and the valve body 102). Instead, the peripheral edge 118 is pinched or compressed between the end 136 of the bonnet 110 and the valve body 102 when the bonnet flange 132 is coupled to the valve body 102. Thus, the position of the bonnet 110 relative to the valve body 102 affects the load imparted on the diaphragm 116 (e.g., a position controlled load).

More specifically, the force exerted by the fasteners 134 is transferred to the peripheral edge 118 of the diaphragm 116 because the bonnet 110 does not directly contact or engage the valve body 102 as the fasteners 134 are tightened. Thus, the fasteners 134 may be over tightened causing a load that is greater than a maximum desired load to be imparted on the diaphragm 116. If the tightening torque exerted on the fasteners 134 is too large, a force or load imparted to the peripheral edge 118 of the diaphragm 116 may be greater than a maximum allowable load, which may cause the peripheral edge 118 to buckle or deform and cause leakage of process fluid between the bonnet 110 and the valve body 102. Also, the peripheral edge 118 of the diaphragm 116 provides a seal that opposes the pressure of the process fluid flowing through the valve body 102. If a tightening force or torque exerted on the fasteners 134 is too small, a load or force compressing the peripheral edge 118 of the diaphragm 116 may be insufficient to prevent leakage of process fluid between the bonnet 110 and the valve body 102 during operation.

Additionally, during assembly, manufacturing tolerances of the diaphragm 116 (e.g., a thickness of the peripheral edge 118) may affect a desired pre-load to be imparted to the diaphragm 116. In such an instance, even if the fasteners 134 are tightened to a recommended torque, the bonnet 110 may apply a load that is too large or too small to the peripheral edge 118 of the diaphragm 116 because the end 136 of the bonnet 110 may be spaced farther away from the valve body 102 due to the manufacturing tolerances of the diaphragm 116. Thus, it may be necessary to manufacture the diaphragm 116 within a relatively small or tight tolerance, which increases manufacturing costs.

In operation, an actuator moves the valve stem 114 away from the drive mechanism 120 to cause first and second arm members 140a and 140b of the drive mechanism 120 to pivot about respective axes 142a and 142b in respective first and second directions 144a and 146a to enable the diaphragm 116 to move away from a valve seat 148 (e.g., the valve body 102) to allow fluid flow through the passageway 104 (e.g., an open position). The actuator moves the valve stem 114 toward the drive mechanism 120 to cause the arms 140a and 140b to pivot about axes 142a and 142b in respective directions 144b and 146b opposite of the respective directions 144a and 144b to engage the diaphragm plate 124 and move the diaphragm 116 into sealing engagement with the valve seat 148 to restrict or prevent fluid flow through the passageway 104 (e.g., a closed position).

In sanitary applications, the diaphragm 116 provides a sanitary condition by preventing process fluid from accumulating within the cavity 122 of the bonnet 110 and/or within crevices or pockets of the cavity 104 such as, for example, between the peripheral edge 118 of the diaphragm and the valve body 102. Thus, the peripheral edge 118 of the diaphragm 116 provides a seal to prevent leakage of process fluid between the bonnet 110 and the valve body 102. However, during operation, the diaphragm 116 may be subjected to relatively high temperatures and/or pressure fluctuations. For example, in sanitary applications, a process fluid having a relatively high temperature (e.g., superheated steam) may flow between the inlet 106 and the outlet 108 causing the diaphragm 116 to expand. Such fluctuations in temperatures and/or pressures can cause the diaphragm 116 to expand and/or contract at different rates than the bonnet 110 and/or the valve body 102 because the expansion rate of the diaphragm 116, which is composed of an elastomeric material, is greater than the expansion rate of the bonnet 110 and the valve body 102 (e.g., a clamping device), which is composed of, for example, stainless steel.

As a result, the expansion and/or contraction of the diaphragm 116 due to temperature and/or pressure fluctuations of the process fluid may cause the diaphragm 116 to deform or become damaged because the peripheral edge 118 is clamped or coupled (e.g., pinched) in a fixed manner between the end 136 of the bonnet 110 and the valve body 102. In other words, in the example of FIG. 1, the relative positions of the bonnet flange 132, the bonnet 110 and/or the valve body 102 are fixed and, thus, do not allow for the expansion of the peripheral edge 118 of the diaphragm 116. Thus, fixedly clamping the diaphragm 116 between the bonnet 110 and the valve body 102 can cause the peripheral edge 118 to deform when the diaphragm 116 expands, thereby reducing the sealing capacity of the diaphragm 116 when the diaphragm 116 cools. In other words, when cooled, the diaphragm 116 may experience thermo-set, which may compromise the sealing integrity or capacity of the diaphragm 116.

Figure 2A:
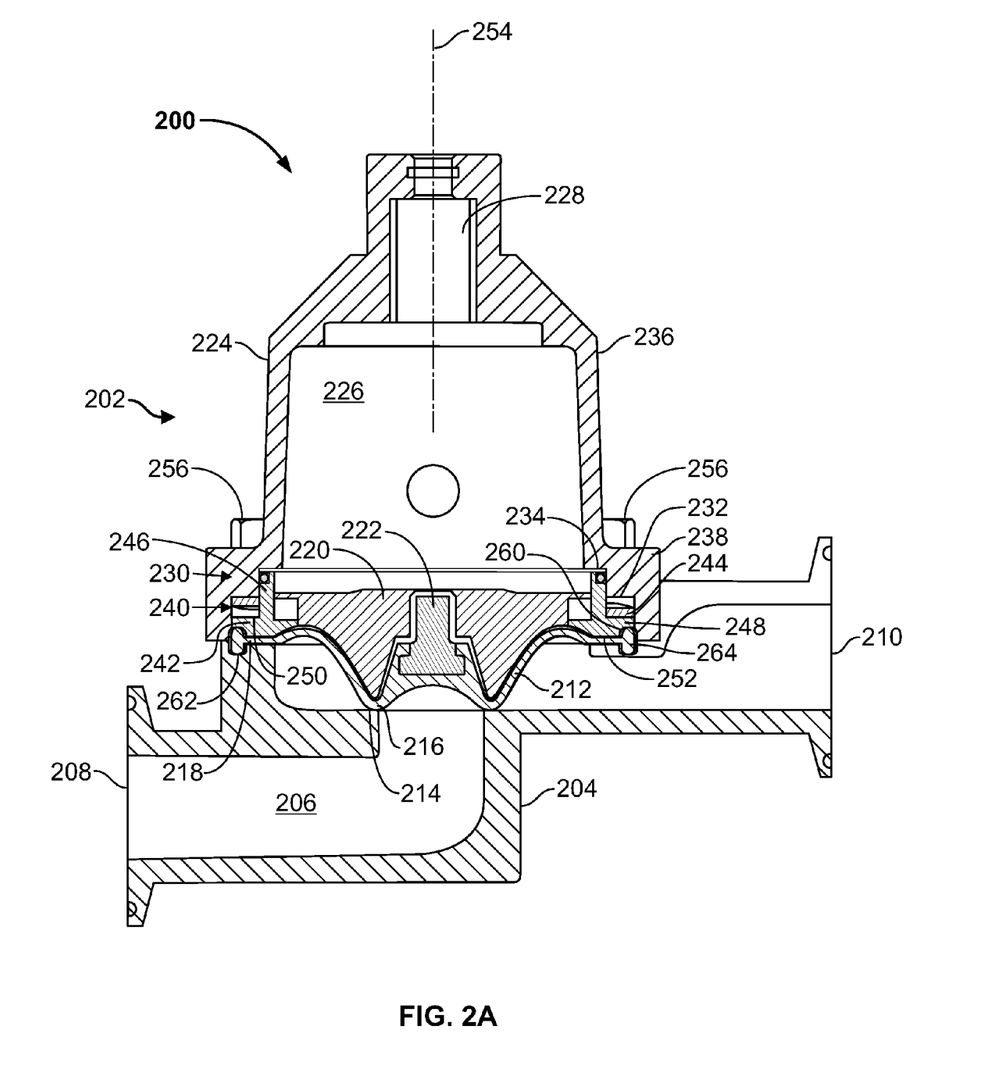
FIG. 2A illustrates an example fluid control valve described herein.
Figure 2B:
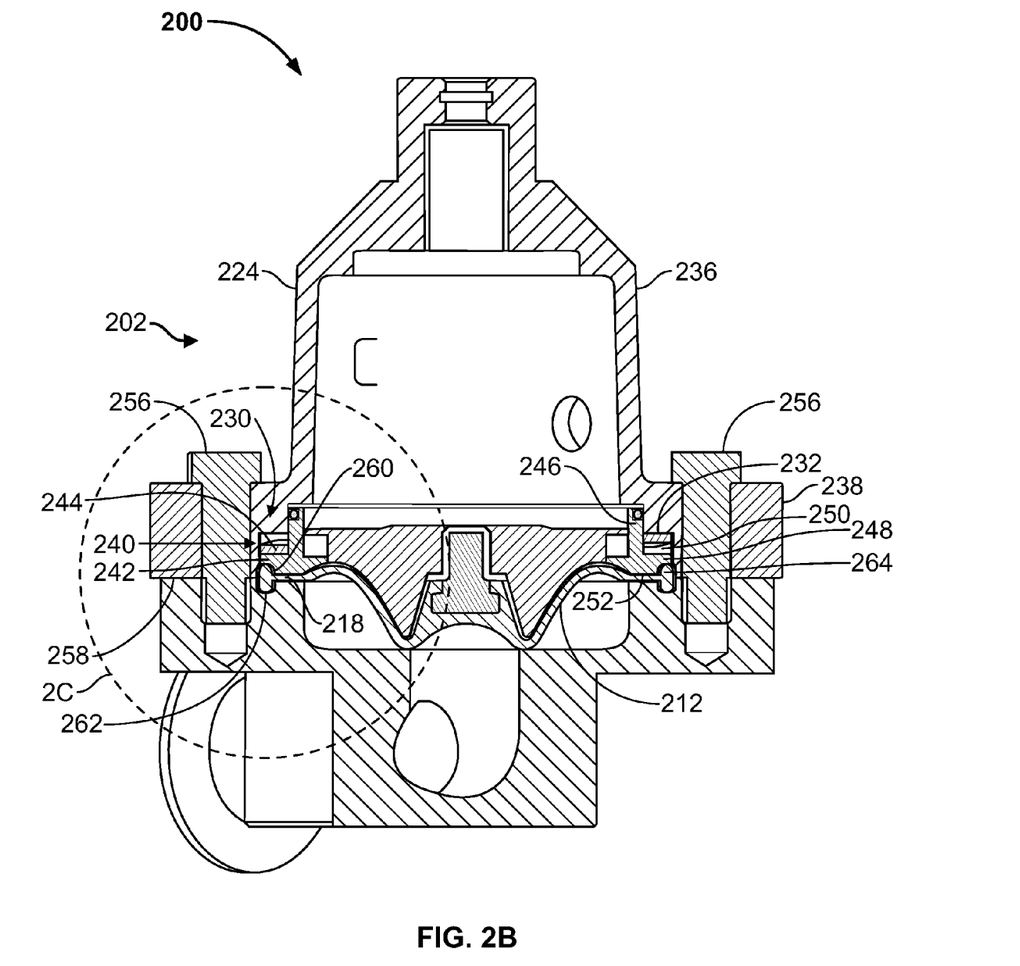
FIG. 2B illustrates another view of the example fluid control valve of FIG. 2A.
Figure 2C:
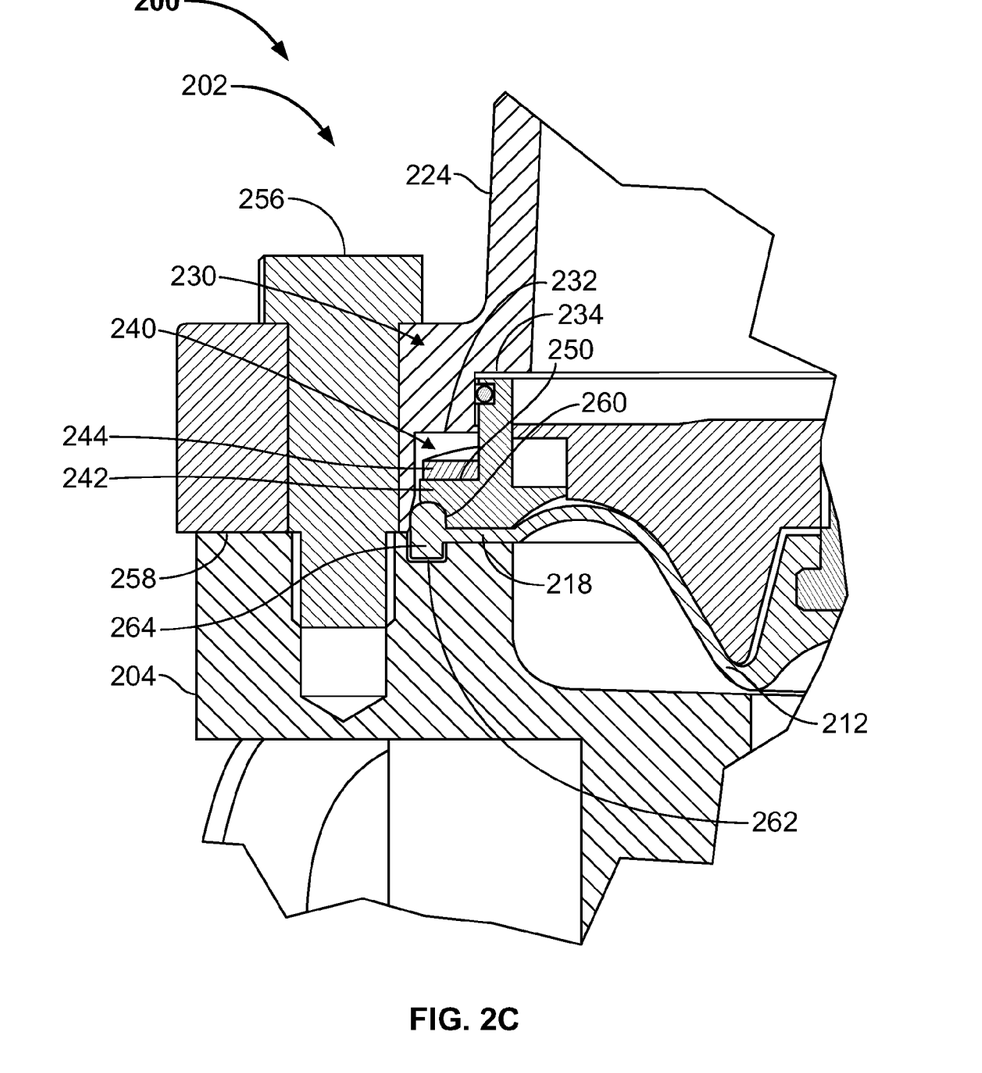
FIG. 2C illustrate an enlarged partial view of the example fluid control valve of FIGS. 2A and 2B.

FIGS. 2A, 2B and 2C illustrate an example fluid valve 200 implemented with an example bonnet apparatus or assembly 202 described herein. FIG. 2A illustrates a cross-sectional view of the example fluid valve 200, FIG. 2B illustrates another cross-sectional view of the fluid valve 200 of FIG. 2A and FIG. 2C illustrates an enlarged portion of the example fluid valve 200 of FIG. 2A.

Referring to FIGS. 2A, 2B, and 2C, the example fluid valve 200 includes a valve body 204 defining a fluid flow passageway 206 between an inlet 208 and an outlet 210. A flow control member or diaphragm 212 is disposed within the fluid flow passageway 206 between the inlet 208 and the outlet 210 and moves relative to a valve seat 214 (e.g., the valve body 204) to control the flow of fluid through the passageway 206. The diaphragm 212 includes a central or flow control portion 216 that moves relative to the valve seat 214 and a peripheral edge or sealing portion 218 (e.g., an outer rim) that is captured between the bonnet assembly 202 and the valve body 204. In this example, the diaphragm 212 is a flexible diaphragm composed of an elastomeric material. In other examples, the diaphragm 212 may be a multi-layer diaphragm composed of, for example, a flexible material (e.g., a rubber material) and chemical resistant material (e.g., a fluoropolymer material). As shown, a diaphragm plate 220, which is coupled to the diaphragm 212 via a fastener 222, provides support to the diaphragm 212. The diaphragm 212 provides a sanitary condition by preventing process fluid from entering and accumulating within the bonnet assembly 202 and/or within crevices or pockets of the cavity 104.

The bonnet assembly 202 couples the valve body 204 to an actuator (not shown) and captures the diaphragm 212 between the bonnet assembly 202 and the valve body 204. The bonnet assembly 202 includes a housing 224 having a internal cavity 226 and an opening 228 to slidably receive a valve stem (e.g., the valve stem 114 of FIG. 1), which operatively couples the diaphragm 212 to an actuator (not shown). Although not shown, a drive mechanism or force amplifier (e.g., the drive mechanism 120 of FIG. 1) may be disposed within the cavity 226 of the housing 224. The housing 224 includes a recessed portion 230 to define a first shoulder or surface 232 and a second shoulder or surface 234 of the housing 224. As shown, the housing 224 is a cylindrical body 236 having a flanged portion 238 integrally formed with the body 236.

The bonnet assembly 202 also includes a load assembly 240 that is disposed within the recessed portion 230 or cavity 226 to capture or couple the peripheral edge 218 of the diaphragm 212 between the housing 224 and the valve body 204. In this particular example, the load assembly 240 includes a movable sealing disc 242 and a biasing element 244. The sealing disc 242 includes a cylindrical body 246 having an annular flange or seating surface 248 (e.g., an integrally formed or unitary structure) to define a shoulder or surface 250. The sealing disc 242 also includes a pressing surface 252 that compresses or contacts the peripheral edge 218 of the diaphragm 212. As shown, the biasing element 244 is disposed between the first shoulder 232 of the housing 224 and the shoulder 250 of the sealing disc 242 to enable the sealing disc 242 to move or float relative to the housing 224 along a longitudinal axis 254. The second shoulder 234 of the housing 224 provides a mechanical stop to limit movement of the sealing disc 242 toward the opening 228 when the body 246 of the sealing disc 242 engages the second shoulder 234.

The housing 224 is coupled to the valve body 204 via fasteners 256. As most clearly shown in FIGS. 2B and 2C and in contrast to the fluid valve 100 of FIG. 1, a surface 258 of the housing 224 engages the valve body 204 when the bonnet assembly 202 is coupled to the valve body 204. Such an engagement provides a mechanical or positive stop to prevent further movement of the housing 224 toward the peripheral edge 218 of the diaphragm 212 when the bonnet assembly 202 is coupled to the valve body 204. Thus, engagement of the housing 224 with the valve body 204 prevents a clamping force provided by the fasteners 256 (e.g., when the fasteners are tightened) from being transferred or imparted to the peripheral edge 218 of the diaphragm 212. Instead, the housing 224 and the valve body 204 absorb the loading from the fasteners 256. Thus, over tightening the fasteners 256 does not impart a load (e.g., a pre-load) on the peripheral edge 218 of the diaphragm 212.

Although not shown, in other examples, the recessed portion 230 of the flange 238 may be removed such that the flange 238 defines the shoulder 234. In this example, at least one spacer or washer (not shown) may be disposed between (e.g., to couple) the flange 238 of the housing 224 and the valve body 204. Additionally, differently sized spacers may be used to vary the load that the biasing element 244 provides to the diaphragm 212.

When coupled to the valve body 204, the sealing disc 242 engages or captures the peripheral edge 218 to capture or retain the diaphragm 212 within the fluid flow passageway 206. Also, the biasing element 244 imparts a load (e.g., a pre-load) to the peripheral edge 218 via the sealing disc 242.

In this particular example, the biasing element 244 is a wave spring or Belleville spring. In other examples, a stack of wave springs or Belleville springs may be used to provide a load to the diaphragm 212. The biasing element 244 provides a controlled or predictable load that is non-destructive to the diaphragm 212 (e.g., less than a maximum allowable load). Also, to facilitate alignment and/or assembly, the sealing disc 242 and/or the valve body 204 may include grooves or channels 260 and 262 (e.g., annular grooves) to receive a portion or bead 264 (e.g., an annular bead) of the peripheral edge 218 of the diaphragm 212.

During assembly, when the housing 224 engages the valve body 204 and the fasteners 256 are tightened, the biasing element 244 imparts a compressive load or pre-load to the peripheral edge 218 of the diaphragm 212 via the sealing disc 242. Additionally, because the housing 224 engages the valve body 204 and the sealing disc 242 moves relative to the housing 224, manufacturing tolerances of the diaphragm 212 can be greater (e.g., greater than the manufacturing tolerances of the diaphragm 116 of FIG. 1), thereby reducing manufacturing costs. In this example, tolerances of the diaphragm 212 do not significantly affect the amount of pre-load imparted on the peripheral edge 218 of the diaphragm 212 during assembly because sealing disc 242 can move relative to the housing 224. The biasing element 244 deflects to impart a compressive load (e.g., a pre-load) to the peripheral edge 218 that is within a predictable or acceptable range. The compressive load imparted to the diaphragm 212 is substantially constant and non-destructive to the diaphragm 212 because the deflection of the biasing element 244 caused by the tolerance stack up of the diaphragm 212 is relatively small compared to the spring rate of the biasing element 244 and the compressive load provided by the biasing element 244 cannot be greater than a maximum compressive load provided by the fully deflected biasing element 244. Also, the surface 258 of the housing 224 engages the valve body 204 and absorbs the clamping load of the fasteners 256 as the fasteners 256 are tightened. Thus, the fasteners 256 do not affect or provide a pre-load to the diaphragm 212.

In operation, an actuator moves the diaphragm 212 relative to the valve seat 214 to control the flow of process fluid through the passageway 206. The diaphragm 212 sealingly engages the valve seat 214 to prevent or restrict fluid flow between the inlet 208 and the outlet 210 (e.g., a closed position) and moves away from the valve seat 214 to allow fluid flow between the inlet 208 and the outlet 210 (e.g., an open position). Although not shown, the fluid valve 200 may include a biasing element (e.g., the biasing element 128 and retainer 130 of FIG. 1) to bias or move the diaphragm 216 away from the valve seat 214.

The temperature and/or pressure of the process fluid may cause the diaphragm 212 (e.g., the peripheral edge 218) to expand or contract. Such fluctuations in temperatures and/or pressures of the process fluid can cause the diaphragm 212 to expand and/or contract at different rates than the housing 224 and/or the valve body 204 because the expansion rate of the diaphragm 212, which is composed of an elastomeric material, is greater than the expansion rate of the housing 224 and/or the valve body 204, which is composed of, for example, stainless steel.

The sealing disc 242 enables the diaphragm 212 to expand or contract when the diaphragm 212 is subjected to temperature and/or pressure fluctuations. In particular, the sealing disc 242 moves toward the first shoulder 232 as the diaphragm 212 expands, thereby compressing or deflecting the biasing element 244. The load provided to the diaphragm 212 by the biasing element 244 is controlled or substantially constant because the deflection of the biasing element 244 caused by the expansion of the diaphragm 212 is relatively small compared to the spring rate of the biasing element 244. Further, the second shoulder 234 provides a stop to prevent the sealing disc 242 from further moving toward the opening 228 and further deflecting the biasing element 244 (e.g., to a fully deflected position). Similarly, the biasing element 244 expands to move the sealing disc 242 toward the valve body 204 and away from the second shoulder 234 as the diaphragm 212 contracts or cools. For example, as the diaphragm 212 contracts, the biasing element 244 expands to maintain a relatively constant pre-load to the peripheral edge 218 of the diaphragm 212.

Figure 3A:
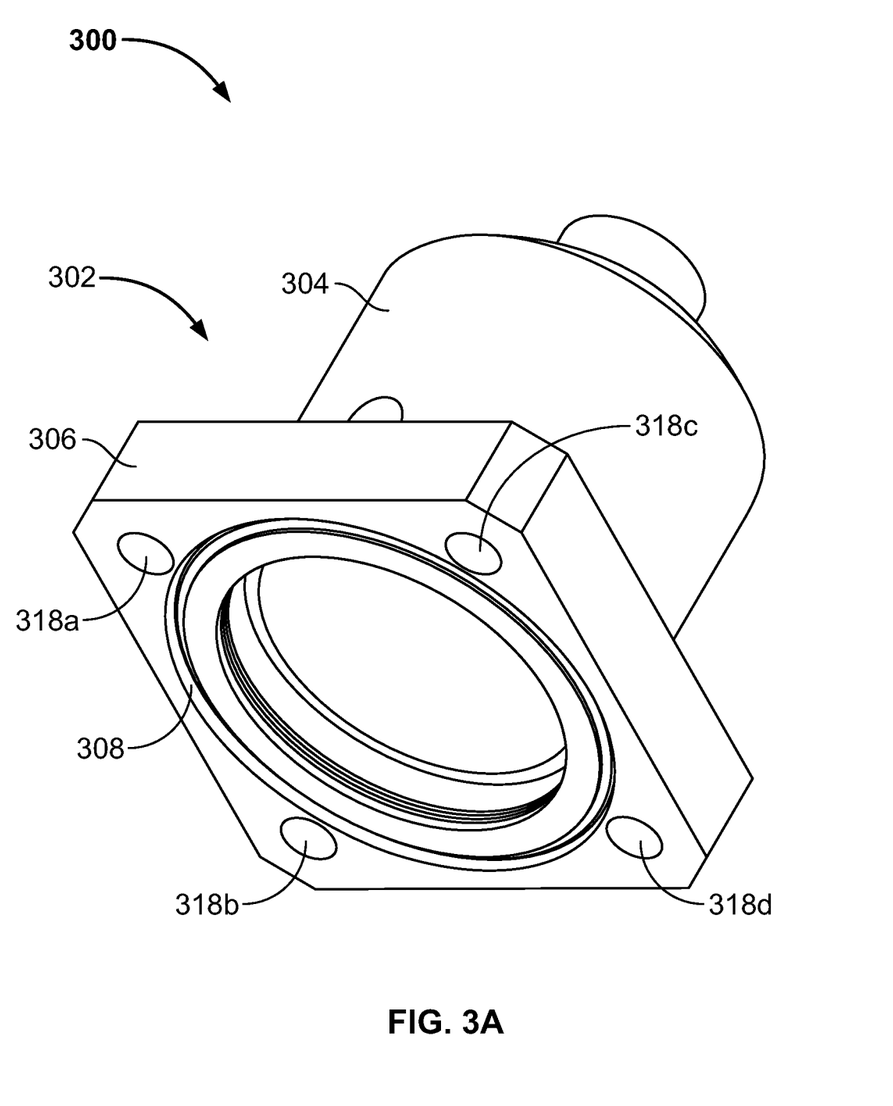
FIG. 3A illustrates an example bonnet assembly described herein that may be used to implement the example fluid control valves described herein.
Figure 3B:
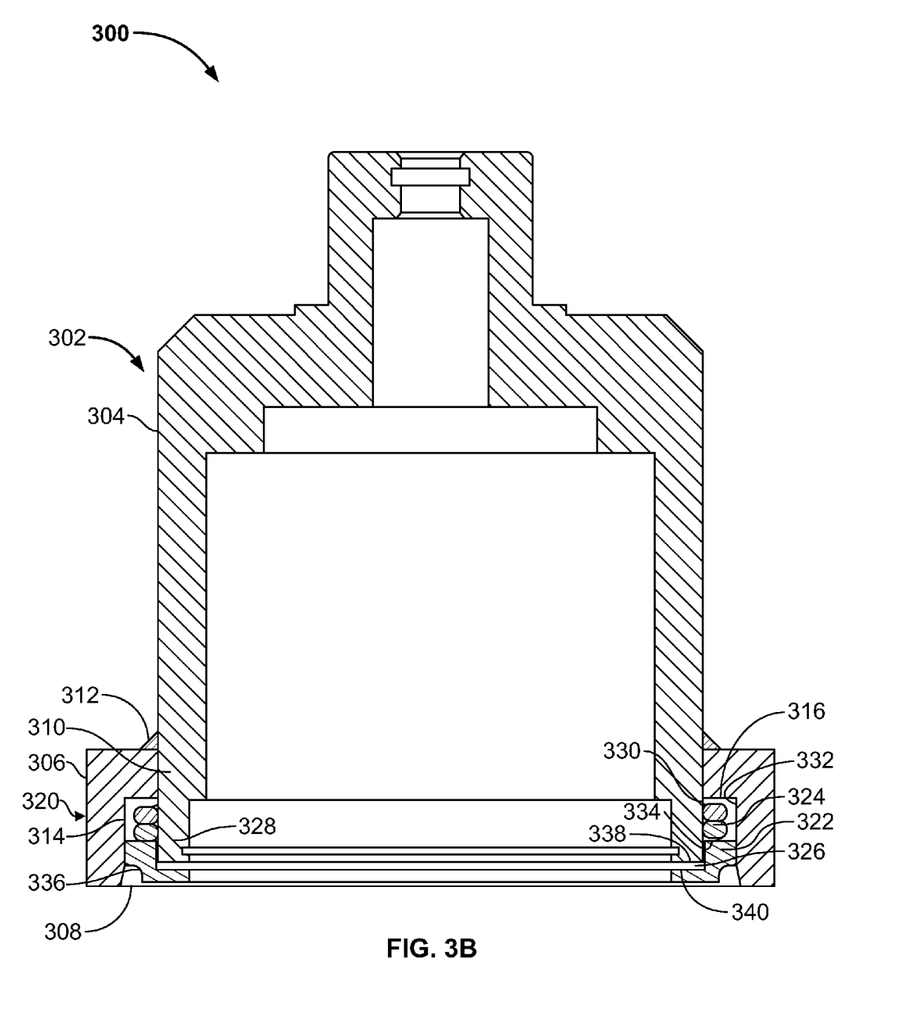
FIG. 3B is a cross-sectional view of the example bonnet assembly shown in FIG. 3A.

FIGS. 3A and 3B illustrate another example bonnet assembly 300 described herein that may be used to implement a fluid device such as, for example, the fluid valve 200 of FIGS. 2A, 2B and 2C. In this example, the bonnet assembly 300 includes a housing 302 having a cylindrical body 304 and a flange 306. The flange 306 may be a separate piece having an opening 308 to receive at least a portion 310 of the body 304 and the flange 306 is coupled to the body 304 via a weld 312. The flange 306 also includes a recess 314 to define a shoulder 316 and a plurality of apertures 318a-d to receive fasteners (not shown) that couple the bonnet assembly 300 to a fluid device (e.g., the valve body 204 of FIGS. 2A-2C). Although not shown, in other examples, instead of the flange 306, spacers or washers may be disposed between the housing 302 or body 304 and a valve body.

The bonnet assembly 300 also includes a load assembly 320. The load assembly 320 includes a movable sealing disc 322 and a biasing element 324. The sealing disc 322 is at least partially disposed within the recess 314 of the flange 306 and includes an annular recess or cavity 326 to receive a portion or end 328 of the body 304. The biasing element 324 (e.g., a spring, a wave spring, etc.) is disposed within the recess 314 of the flange 306 between an outer surface 330 of the body 304 and an inner surface 332 of the flange 306 and between the shoulder 316 of the flange 306 and a seating surface 334 of the sealing disc 322. Thus, the biasing element 324 biases the sealing disc 322 away from the body 304. The body 304, the flange 306 and/or the sealing disc 322 may be composed of stainless steel or any other suitable material. The sealing disc 322 may also include an annular channel or groove 336 to receive a portion of a seal or diaphragm (e.g., the annular bead 264 of the diaphragm 216) to facilitate alignment of the diaphragm.

During assembly, the bonnet assembly 300 is to be coupled to a body of a fluid device to engage or capture a seal and/or a diaphragm. The biasing element 324 provides a pre-load to the seal or diaphragm via the sealing disc 322 independent of a clamping force provided by fasteners (not shown) that couple the bonnet assembly 300 to a body (e.g., the valve body 204 of FIGS. 2A-2C) of a fluid device. Additionally, the sealing disc 322 can move or float within the recess 314 relative to the flange 306 and body 304.

In operation, the load assembly 320 enables a seal and/or a diaphragm composed of, for example, an elastomeric material to expand or contract due to pressure and/or temperature fluctuations of a fluid flowing through the fluid device. For example, as the seal and/or diaphragm expands, the sealing disc 322 moves toward the body 304 to compress the biasing element 324. In this example, an end 338 of the body 304 provides a mechanical stop to limit movement of the sealing disc 322 toward the body 304 when a surface 340 of the sealing disc 322 engages or contacts the end 338 of the body 304. When the seal and/or diaphragm contract, the biasing element 324 expands causing the sealing disc 322 to move away from the end 338 of the body 304. Thus, the sealing disc 322 moves within the housing while the biasing element 324 provides a relatively constant load to the seal or diaphragm because the rate of expansion of the diaphragm is relatively small compared to the spring rate of the biasing element 324.

The example bonnet and/or load assembly described herein may be used to provide live-loading to seals and/or diaphragms of fluid devices such as, for example, fluid valves, pumps and/or any other suitable fluid devices. The example bonnet assembly described herein applies a controlled, relatively constant compressive load to a seal of a fluid device during operation. For example, a load assembly includes a biasing element that imparts a relatively constant compressive load to a seal via a sealing disc. Therefore, the load assembly provides a non-destructive compressive load to prevent damage to a seal and/or a diaphragm.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A fluid valve, comprising:
   a valve body having a fluid flow passageway between an inlet and an outlet;
   a bonnet coupled to the valve body; and
   a diaphragm having a peripheral edge clamped between a load assembly of the bonnet and the valve body, the load assembly comprising:
   a sealing disc disposed between an opening of the bonnet and the diaphragm; and
   a biasing element disposed between the sealing disc and the bonnet, the biasing element to bias the sealing disc toward the diaphragm to provide a load to the peripheral edge of the diaphragm, and the sealing disc to move relative to the bonnet to allow the peripheral edge of the diaphragm to expand or contract during operation.

2. A fluid valve of claim 1, wherein a fastener couples the bonnet to the fluid valve, wherein the load provided by the biasing element to the peripheral edge of the diaphragm is independent of an amount of torque applied to the fastener when coupling the bonnet to the valve body.

3. A fluid valve of claim 1, wherein the biasing element comprises a wave spring.

4. A fluid valve of claim 1, wherein the bonnet comprises a cylindrical body.

5. A fluid valve of claim 1, wherein the biasing element comprises a Belleville spring.

6. A fluid valve of claim 1, wherein the bonnet includes a flange that engages the valve body when the bonnet is coupled to the valve body.

7. A fluid valve of claim 6, wherein the flange is integrally formed with the bonnet.

8. A fluid valve of claim 6, wherein the flange is coupled to the bonnet via a weld.

9. A fluid valve of claim 6, wherein the flange includes a recessed opening to define a shoulder.

10. A fluid valve of claim 9, wherein the sealing disc moves within the recessed opening relative to the flange during operation of the fluid valve to allow the peripheral edge of the diaphragm to expand or contract while providing a relatively constant load to the diaphragm.

11. A fluid valve of claim 9, wherein the sealing disc is disposed in the recessed opening of the flange.

12. A fluid valve of claim 1, wherein the sealing disc comprises a cylindrical body and a seating surface.

13. A fluid valve of claim 1, wherein the load applied to the diaphragm is provided by the biasing element and is not provided by a fastener that couples the bonnet to the valve body.

14. A fluid valve of claim 1, wherein the sealing disc is composed of stainless steel.

15. A fluid valve of claim 1, wherein the bonnet engages the valve body to provide a positive stop to prevent a clamping force from being imparted to the peripheral edge of the diaphragm that is greater than the load provided by the biasing element when the bonnet is coupled to the valve body.

16. A fluid valve of claim 15, further comprising a fastener to couple the bonnet to the valve body, the fastener to provide the clamping force.

17. A fluid valve of claim 1, wherein the sealing disc slides in a direction along a longitudinal axis of the opening of the bonnet when the peripheral edge of the diaphragm expands or contracts.

18. A fluid valve of claim 1, wherein the load assembly is positioned between the bonnet and the peripheral edge of the diaphragm.

19. A fluid valve, comprising:
a valve body having a fluid flow passageway between an inlet and an outlet;
a bonnet coupled to the valve body, the bonnet having a flange to engage the valve body when the bonnet is coupled to the valve body, the flange includes a recessed opening to define a shoulder; and
a diaphragm having a peripheral edge clamped between a load assembly of the bonnet and the valve body, the load assembly comprising:
a sealing disc disposed between an opening of the bonnet and the diaphragm, the sealing disc having a cylindrical body and a seating surface; and
a biasing element disposed between the sealing disc and the bonnet, wherein the biasing element biases the sealing disc toward the diaphragm to provide a load to the peripheral edge of the diaphragm, and wherein the sealing disc moves relative to the bonnet to allow the diaphragm to expand or contract, wherein the biasing element is disposed between the shoulder of the flange and the seating surface of the sealing disc.

20. A bonnet assembly, comprising;
means for providing a load to a peripheral seal portion of a diaphragm disposed within a fluid flow passageway of a valve body, the means for providing a load to move relative to the peripheral seal portion when the peripheral seal portion of the diaphragm expands or contracts during operation;
means for housing the means for providing a load; and
means for coupling the means for housing to the valve body, the means for housing to engage the valve body to prevent a clamping force provided by the means for coupling that is greater than a load provided by the means for providing a load from being transferred or imparted to the peripheral seal portion of the diaphragm.

21. A bonnet assembly of claim 20, wherein the means for providing a load is to maintain a relatively constant load to the peripheral seal portion of the diaphragm when the peripheral seal portion of the diaphragm expands or contracts during operation.

* * * * *